US007227596B2

(12) United States Patent
Weitbruch et al.

(10) Patent No.: US 7,227,596 B2
(45) Date of Patent: Jun. 5, 2007

(54) COLOUR DEFECTS IN A DISPLAY PANEL DUE TO DIFFERENT TIME RESPONSE OF PHOSPHORS

(75) Inventors: Sébastien Weitbruch, Mönchweiler (DE); Cedric Thebault, Villingen-Schwenningen (DE); Axel Goetzke, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 370 days.

(21) Appl. No.: 10/481,086

(22) PCT Filed: Jun. 3, 2002

(86) PCT No.: PCT/EP02/06038

§ 371 (c)(1),
(2), (4) Date: Dec. 17, 2003

(87) PCT Pub. No.: WO03/001493

PCT Pub. Date: Jan. 3, 2003

(65) Prior Publication Data

US 2004/0169732 A1 Sep. 2, 2004

(30) Foreign Application Priority Data

Jun. 23, 2001 (EP) .................................. 01250237

(51) Int. Cl.
*H04N 9/12* (2006.01)

(52) U.S. Cl. ......................... 348/797; 348/607; 345/77

(58) Field of Classification Search ................ 348/797, 348/799, 800–803, 790–791, 808, 810, 655, 348/607; 345/741.1–79, 83, 87, 88, 90, 99, 345/101, 74.1–79; 313/483–486, 496
See application file for complete search history.

(56) References Cited

U.S. PATENT DOCUMENTS

| | | | | |
|---|---|---|---|---|
| 5,337,092 | A * | 8/1994 | Minoura | 348/776 |
| 5,731,794 | A * | 3/1998 | Miyazawa | 345/88 |
| 6,778,160 | B2 * | 8/2004 | Kubota et al. | 345/89 |
| 7,042,422 | B2 * | 5/2006 | Weitbruch et al. | 345/63 |
| 7,064,731 | B2 | 6/2006 | Doyen et al. | 345/60 |

FOREIGN PATENT DOCUMENTS

| | | |
|---|---|---|
| EP | 896317 | 2/1999 |
| EP | 924684 | 6/1999 |
| EP | 974953 | 1/2000 |
| EP | 978817 | 2/2000 |

OTHER PUBLICATIONS

Search report dated Oct. 15, 2002.

* cited by examiner

*Primary Examiner*—Michael H. Lee
(74) *Attorney, Agent, or Firm*—Joseph J. Laks; Harvey D. Fried; Patricia A. Verlangier

(57) ABSTRACT

The luminous elements of the three colours red, green and blue of a plasma video display have different time responses. Therefore, a coloured trail/edge appears behind and in front of the edges of a moving object. In order to reduce the disturbing character of such coloured trails/edges, correcting the video data for blue and red phosphor elements to compensate for the different time responses discolor them. Then only a discolored trail/edge appears which is less disturbing.

11 Claims, 5 Drawing Sheets

COLOUR DEFECTS IN A DISPLAY PANEL DUE TO DIFFERENT TIME RESPONSE OF PHOSPHORS

This application claims the benefit, under 35 U.S.C. § 365 of International Application PCT/EP02/06038, filed Jun. 3, 2002, which was published in accordance with PCT Article 21(2) on Jan. 3, 2003 in English and which claims the benefit of European patent application No. 01250237.3, filed Jun. 23, 2001.

The present invention relates to a method for processing video pictures for display on a display device having at least two kinds of luminous elements with different time responses. Furturemore, the present invention relates to a corresponding device for processing video pictures.

BACKGROUND

As the old standard TV technology (CRT) has nearly reached its limits, some new display panels (LCD, PDP, OLED, DMD, . . . ) are encountering a growing interest from manufacturers. Indeed, these technologies now make it possible to achieve real flat colour panels with very limited depth.

Referring to the last generation of European TV, a lot of work has been made to improve its picture quality. Consequently, the new technologies have to provide a picture quality as good or better than the standard CRT TV technology. On the one hand, these new technologies give the possibility of flat screens, of attractive thickness, but on the other hand, they generate new kinds of artefacts, which could reduce the picture quality. Most of these artefacts are different as for CRT-TV pictures and so more visible since people are used to seeing old TV artefacts unconsciously.

One of these artefacts is due to the different time responses of the three different luminous materials for the RGB colours used in the panel. This difference generates a coloured trail behind and in front the bright objects moving on a dark background mainly (or the opposite). In case of a plasma display panel (PDP), this artefact is known as "phosphor lag" effect.

FIG. 1 shows a simulation of such a phosphor lag effect on a natural scene with a movement basically in the vertical direction. There is a coloured trail at the edge of the dark background and the white trouser.

On a plasma panel, the red, green and blue luminous elements (also named phosphors while not necessarily having the chemical element P) do not have the same properties because of the chemical properties of each phosphor. In addition the life duration and the brightness are privileged at the expense of behaviour homogeneity. Measurements show that the green phosphor is the slowest, the blue one is the fastest and the red one is mostly in-between. Thus, behind a white object in motion, there is a yellow-green trail, and in front a blue area, as illustrated in FIG. 2.

One known solution from the former patent application FR 0010922 of Thomson multimedia is to compensate the coloured trail while modifying the blue component in the temporal domain.

The phosphor lag problem mainly appears on strong edges of an object in motion, especially on bright to dark transitions or the opposite. In the case of plasma display panels (PDP), the result is a kind of yellowish trail behind each bright to dark transition and a blue area in front of it. This is a result of the difference in the time responses of the phosphors.

INVENTION

The object of the present invention is to make the phosphor lag artefact less disturbing for a customer.

In the future, the development of new chemical phosphor powders could avoid such problems by making the green and red phosphors quicker. Nevertheless, today it is not possible by bare signal processing methods to completely suppress this effect but one can try to make it less disturbing for a customer.

The most cumbersome is not the trail but its colour. For that reason, according to the present invention it is proposed to discolour the trail with video processing means. They can be used not only for PDP, but also for LCD etc. The general idea is to add an artificial coloured trail on the phosphor trail to discolour it. There is a need for a motion estimator that calculates motion vectors for the pixels to do this type of compensation.

Thus the above addressed object is solved by a method according to claim 1 and a device according to claim 7.

For discolouring the trail the difference between the video values of two or more adjacent pixels in the direction of the calculated motion vector is used as a scaling factor for the exponentially decreasing function with which the video values for the artificial trail are calculated. This avoids to implement a separate edge detector for finding the trails to be compensated. Not only the trail behind a moving object is compensated according to the invention. In one embodiment of the invention also the coloured edge in front of the moving object will be compensated. The invention therefore can include to add on the natural green/red trail behind a moving object, a complementary artificial (red/blue) trail, and to remove, in front, the red/blue area in order to be sure the eye will not perceive differences of colour on the object. These coloured areas will be added on the motion trajectory defined by the estimated motion vectors.

Advantageous embodiments are apparent from the dependent claims.

In summary, the present invention shows the following advantages:

- The trails due to "phosphor lag" problem and more generally to different time responses of the three colours used in a matrix panel are discoloured.
- The compensation being made is completely flexible. It can be adapted to any kind of phosphors or panels, whereby the values of the trail are completely variable. The proposals are affecting the video signal processing part that is not technology dependent.
- The compensation is made on the full picture: it does not introduce threshold, so it avoids the apparition of new artefacts.

DRAWINGS

Exemplary embodiments of the invention are illustrated in the drawings and are explained in more detail in the following description.

EXEMPLARY EMBODIMENTS

Preferred embodiments of the present invention will be explained along with FIGS. 3 to 7.

Figure 3:
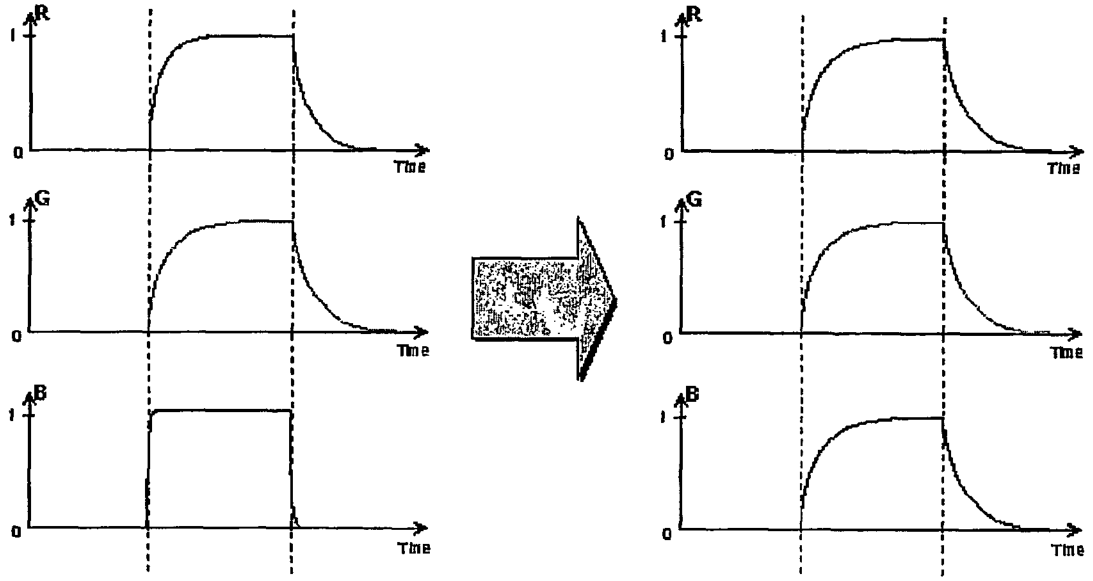
FIG. 3 shows the time response of a red, green and blue phosphor element and the compensated time responses according to the present invention.

As it is impossible to make the green phosphor (the slowest) faster only by signal processing, the red and the blue one will be made slower according to the invention as shown in FIG. 3.

This is equivalent to add on the green/red trail, behind, a red/blue (complementary of the green/red) trail, and, to remove in front a red/blue area from the red/blue area. The result is a grey trail behind and a grey edge in front, which is not disturbing as much as a coloured trail/edge.

In order to establish the form and the value of the trail to be added, the responses of the three phosphors have been measured with a photodiode. From these values, a trail was generated for the red and the blue phosphor elements.

Figure 4A:
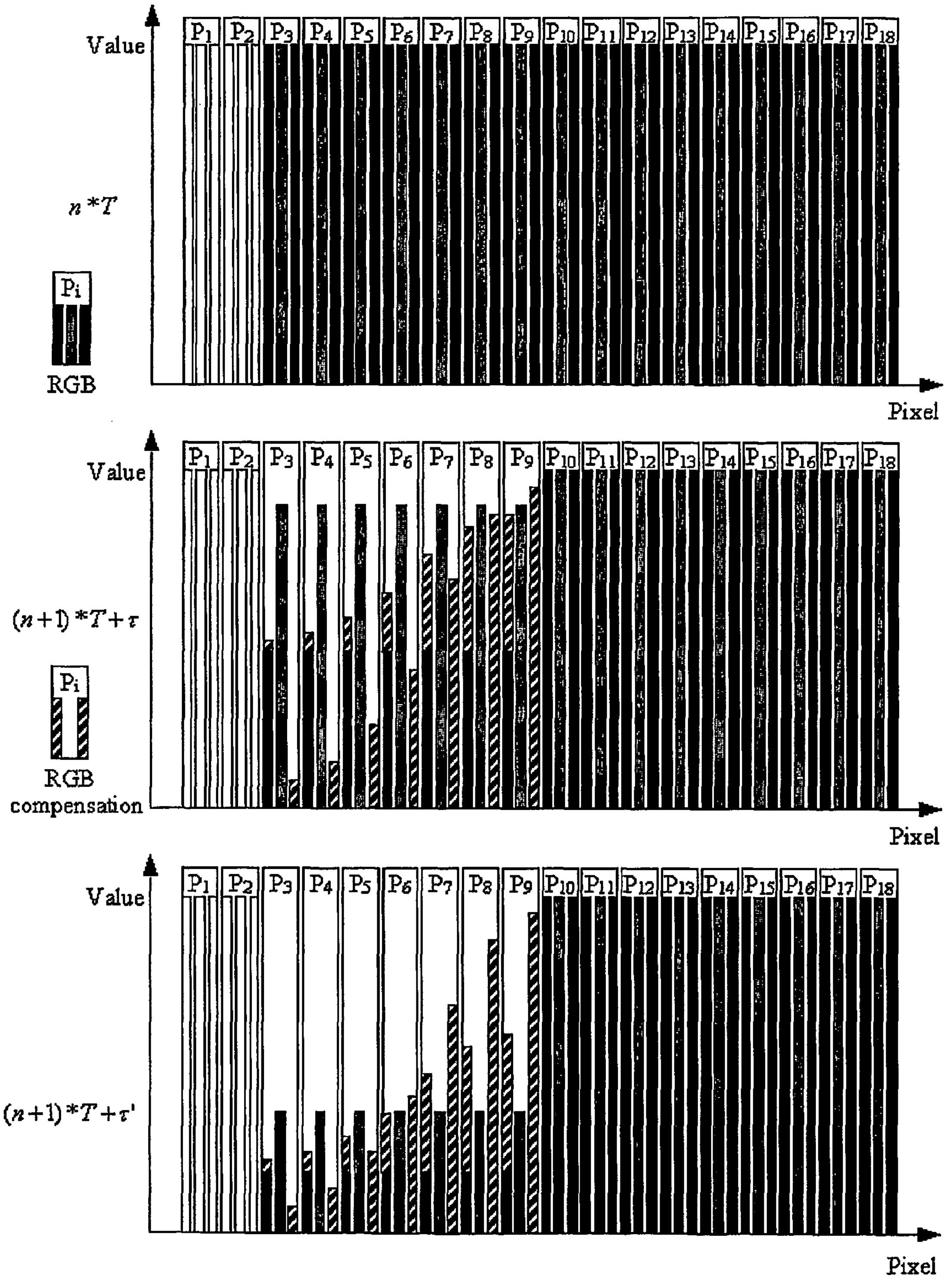
FIG. 4 shows the compensation of a temporal trail with spatial gradation.
Figure 4B:
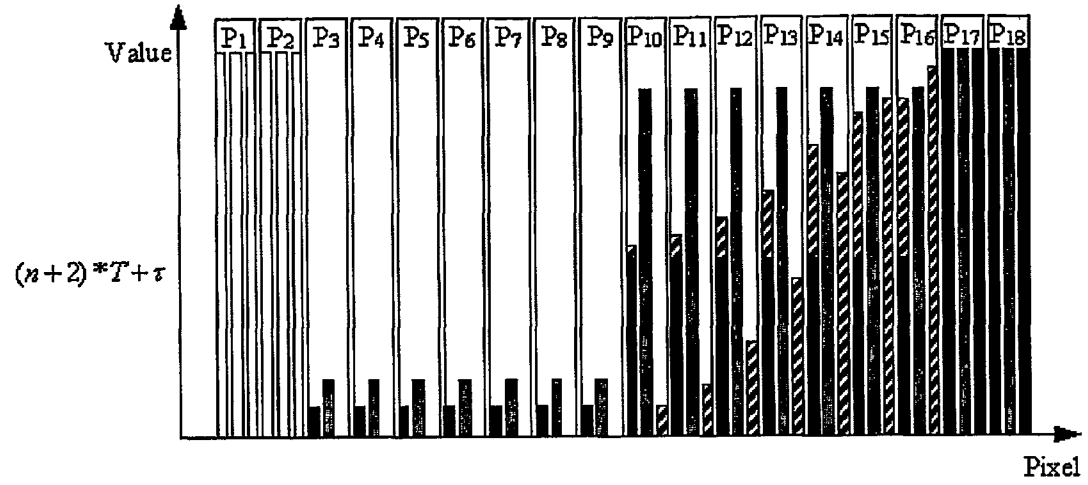

FIGS. 4A and 4B shows an example of a trail where, for instance, a white square consisting of pixels $P_3$ to $P_{18}$ shifts 7 pixels per frame on a black background to the right. The top diagram in FIG. 4A shows the video values of red, green and blue pixel elements in one video line at a time n×T. Here, n is the frame number and T is the frame period. Pixels $P_1$ and $P_2$ are background pixels and therefore there is no video value shown. Pixels $P_3$ to $P_{18}$display one line of a white screen and the video value is for example 255 when 8-bit values are used.

The second diagram of FIG. 4A shows the black background entering the white portion $P_3$ to $P_9$ of the screen at a time (n+1)×T+t, where 0<t<T. At a given time each group of 7 pixels has the same value, and this value is decreasing during the time. Short after the entrance of the black background into the portion $P_3$ to $P_9$ of the white square at the time (n+1)×T+t the 7 blue pixels have the value zero, the 7 red pixels still have a medium value and the 7 green pixels still have a high luminance value. The values corresponding to a spatial exponential function, drawn in hatched manner, shall not be regarded yet.

At the time (n+1)×T+t', where t'>t and 0<t'<T, shown in the third diagram of FIG. 4A, the values of the 7 red and green pixels $P_3$ to $P_9$ have further decreased and at the later time (n+2)×T+t, shown in FIG. 4B, the values have still more decreased, wherein the black background has shifted forward 7 more pixels $P_{10}$ to $P_{16}$ so that the pixel values of the pixels $P_{10}$ to $P_{16}$ are equal to those of the pixels $P_3$ to $P_9$ of the second diagram of FIG. 4A.

However, as the human eye follows the movement, it does not see the same value for the 7 pixels but a gradation. This is due to another effect called dynamic false contour effect that has been described in detail in former patent applications like the European patent applications 00250182.3, 00250390.2, 00250230.0 and in EP-A-978 817. Therefore, as shown on FIGS. 4A and 4B, the temporal trail is compensated with a spatial gradation that may be dependent on the motion vector and on the measured values of the decay process of the phosphors. The spatial gradation is realized by adding driving values (sustain pulses) to the blue and red pixels decreasing e.g. exponentially from the edge. These added values are drawn in hatched manner in the diagrams of FIGS. 4A and 4B except for the first one.

The compensation is analogue in front of the object; however, the different time responses are not compensated by adding a trail but reducing the video value for the blue component that is leading. In summary, activating the red and green phosphors at the front edge of the moving object with more sustain pulses and/or reducing the sustain pulses for the blue phosphor provides the compensation.

Figure 5:
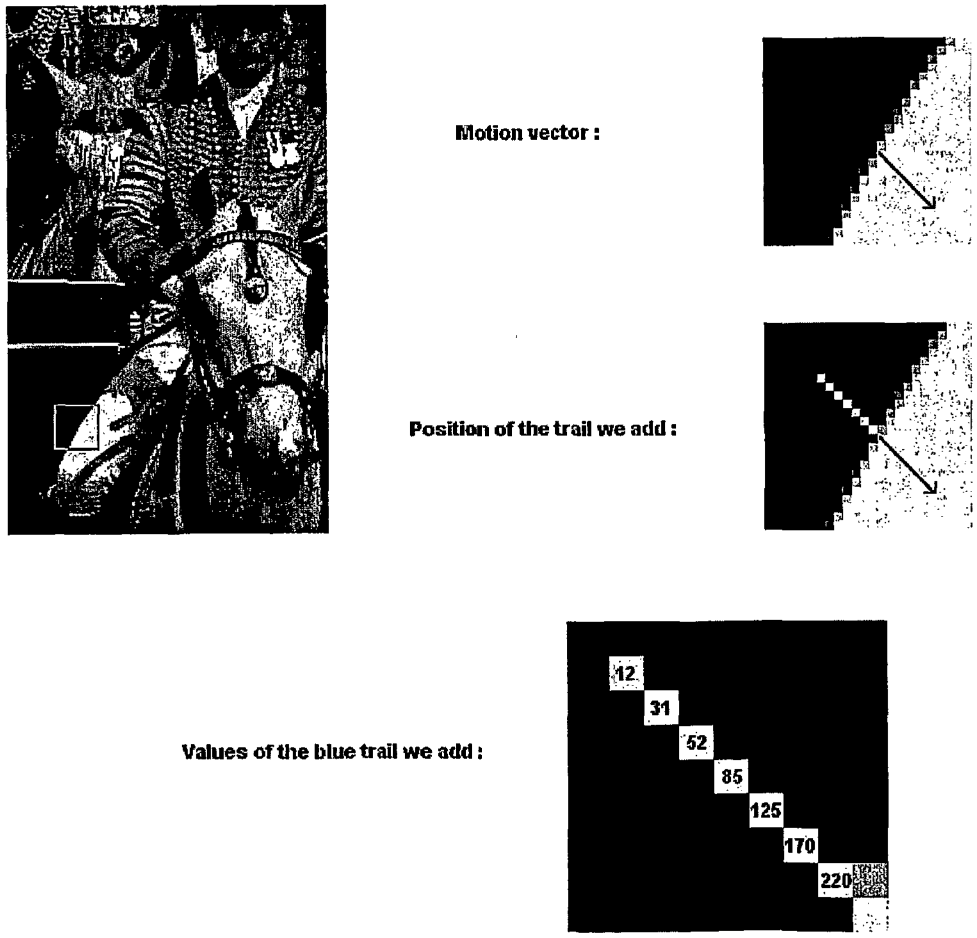
FIG. 5 shows the discolouration of a trail in the direction of an estimated motion vector.

A motion-estimator is needed to determine the direction and the amplitude of the trail to be added. As shown in FIG. 5 in the direction defined by the motion vector, a trail is added, which is proportional to the estimated difference between the green and blue value at a predefined point in time. It is shown that the values that are added to the blue colour component are decreasing non-linearly, e.g. with an exponential decreasing function. The exponentially decreasing function is of the form:

$$\mathrm{Corr}\ (x)=([B_n-B_{n+1}]/255)*a*B_n*\exp\ (-b*x*v)$$

where x is the pixel position on the trail, v is the motion vector length, $B_n$ is the video value of the blue component at the position of the current pixel, $B_{n+1}$ is the video value of the blue component at the position of a neighbouring pixel and a and b are adjustment constants. The scaling factor $[B_n-B_{n+1}]/255$ is used to adapt the correction to the transition strength. For example, if the difference between two adjacent pixels is marginal, the correction will also vanish. This makes the correction algorithm easy to implement. The correction algorithm is performed simply for each pixel of the picture. A specialised edge detector need not be implemented.

For a given panel type it is best to make exact measurements in order to find the best adjustment constant a and b. For a simple implementation a number of look-up tables could be used for different motion vectors where the correction values are stored. The length of the trail to be added is determined by the motion vector length. If the motion vector length is 7 pixels, then the trail to be added is s distributed over 7 pixels in the opposite direction of the motion vector as shown in FIG. 5. This avoids the introduction of a new artefact.

The motion estimator that needs to be used in this compensation method can be of any type that provides a vector per pixel. This kind of motion estimators are existing in the prior art. Motion estimators that are specifically adapted to the PDP technology are known e.g. from the document WO-A-01/24152. For the disclosure of this invention it is therefore expressively referred also to this document.

The application of the disclosed formula is very simple if the motion direction is solely horizontal or vertical. For the other directions it is more complicated to distribute the corrections along the opposite motion vector. However, by storing the coordinates of the pixel position in the look-up tables for each motion vector, complicated calculations can be avoided. For example, if the motion is 7 pixels per frame to the right and 7 pixels per frame down, only the 7 pixels along the opposite motion vector are used for the trail addition.

Figure 1:
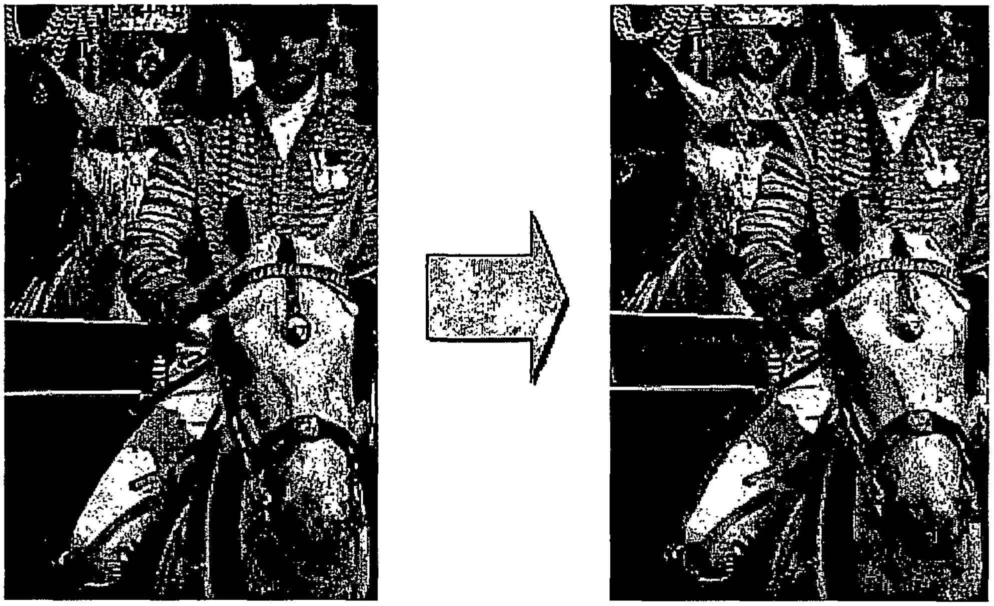
FIG. 1 shows a simulation of the phosphor lag effect on a natural scene.
Figure 2:
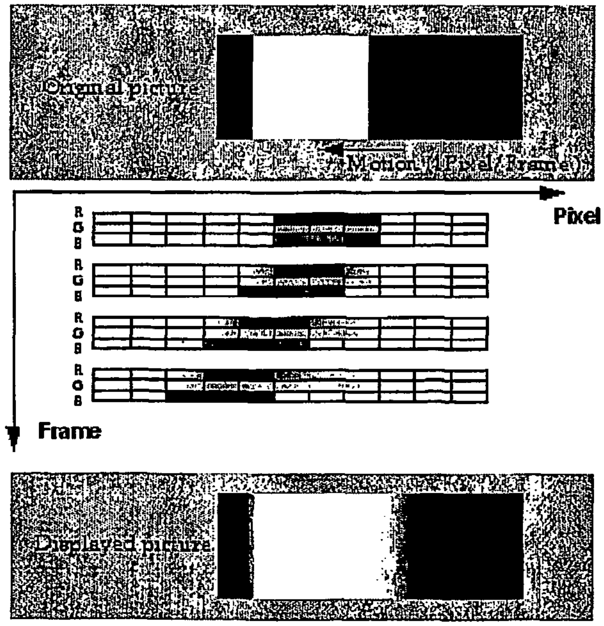
FIG. 2 shows a principal scheme for explaining the phosphor lag effect.
Figure 6:
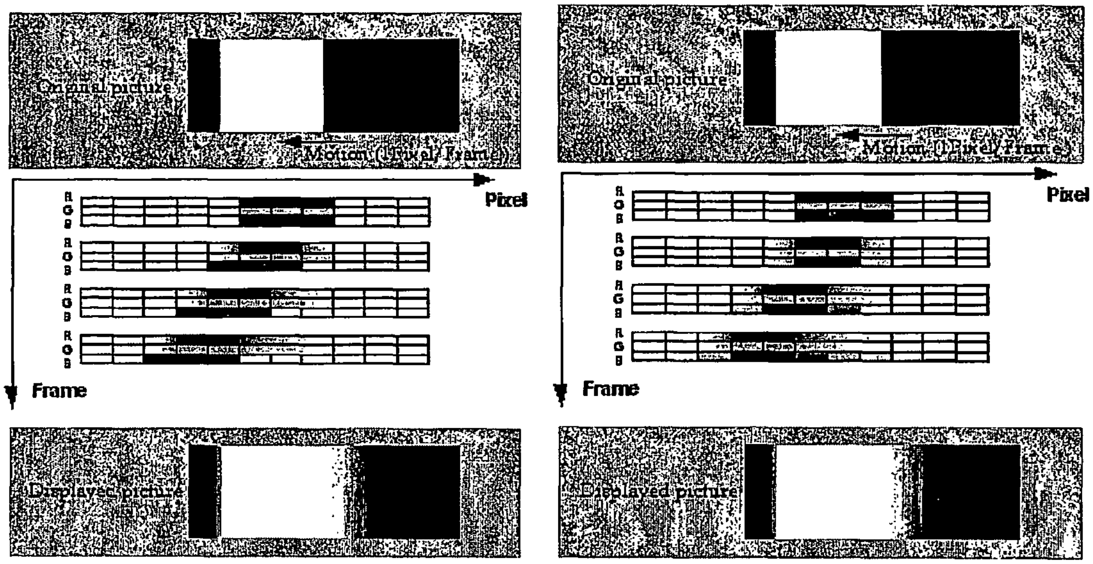
FIG. 6 shows a principal scheme of the discolouration of a trail in contrast to FIG. 2.

FIG. 6 illustrates the implementation of such an algorithm in the case of a white square moving on a black background. In the left part the picture of FIG. 2 is once again shown. In the right part the compensated picture is shown. Compared to FIG. 2 one can see the result of the inventive processing. The phosphor trail located behind and in front of the moving object has not changed in terms of length but its unnatural coloured aspect has disappeared. With such a processing, the moving object looks like more natural for the customer eye. In this example the compensation on the blue component is not only done on the moving pixel but also on the two pixels behind the moving pixel.

Figure 7:
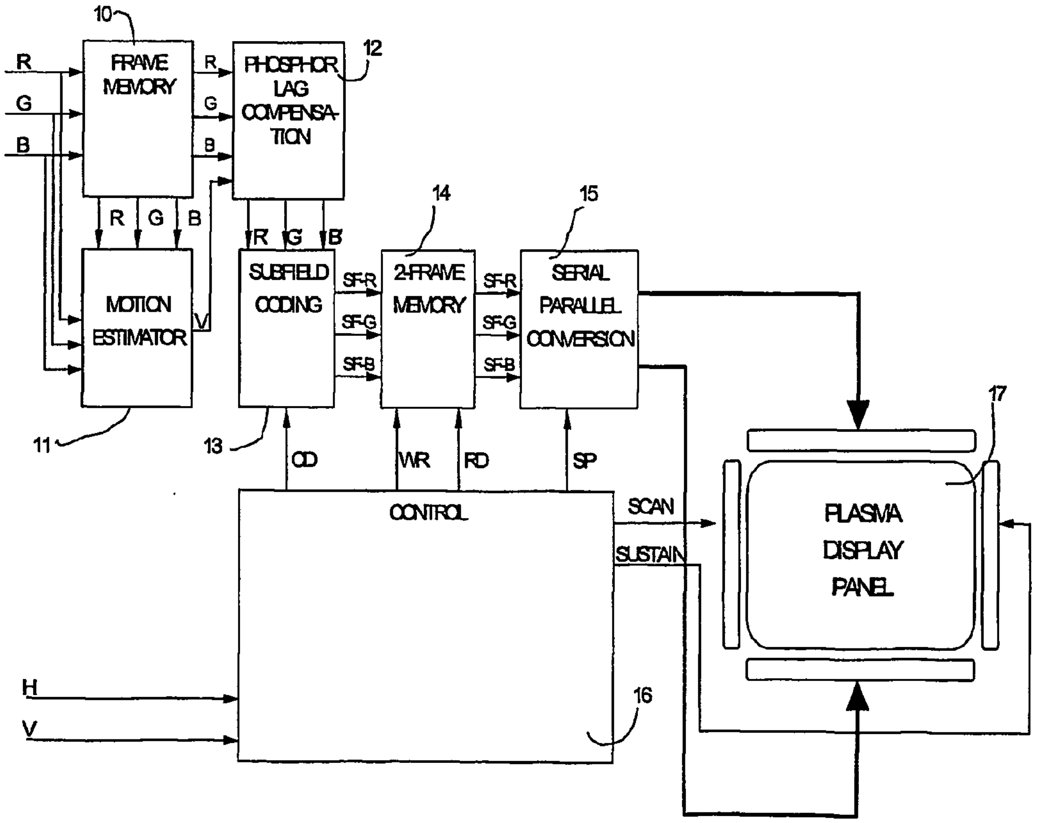
FIG. 7 shows a block diagram for a circuit implementation of the device according to the invention.

In FIG. 7 a circuit implementation of the invention is illustrated. Input R,G,B video data of a first frame $F_n$ is forwarded to a frame memory 10 and a motion estimator 11. Motion estimator 11 provides motion vector data $V_x$ and $V_y$ for the pixels of frame $F_{n-1}$. This information is used in the phosphor lag compensation unit 12. The motion estimator 11 provides the motion vector data to the compensation unit 12. With the motion vector information the compensation unit 12 finds the appropriate look-up table with the start correction values. These values are multiplied with the scaling factor $[B_n-B_{n+1}]/255$ giving the final correction values.

The compensated R, G and B components are forwarded to a sub-field coding unit 13 that performs sub-field coding under control of control unit 16. The sub-field code words are stored in memory unit 14. The external control unit 16 also controls reading and writing from and to this memory unit. The external control unit 16 also generates timing signals for the control of the units 10 to 12 (not shown). For plasma display panel addressing, the sub-field code words are read out of the memory device and all the code words for one line are collected in order to create a single very long code word which can be used for the line wise PDP addressing. This is carried out in the serial to parallel conversion unit 15. The control unit 16 generates all scan and sustain pulses for PDP control. It receives horizontal and vertical synchronising signals for reference timing.

The above-described technique is applicable to all displays based on sources presenting different time responses for the three colours. In particular it is applicable to PDP, LCD, OLED and LCOS displays.

As described in the introductory part, the coloured trail may be compensated by modifying for example the blue component in the time domain. However, since this technique is complementary to that of the present invention, both can be applied together.

The invention claimed is:

1. Method for processing video pictures for display on a display device having at least two kinds of luminous elements with different time responses, comprising selecting at least one of the color components video data for the luminous elements that show a time response different than the slowest time response and correcting the color component video data for driving luminous elements not belonging to the slowest kind before a step of sub-field coding is performed, so that the differences in time responses of luminous elements are artificially compensated, wherein a temporal trail of a moving object on the display device is compensated in the correcting step by adding gradated correction values to the video data not belonging to the slowest kind of the pixels of the trail.

2. Method according to claim 1, further including the step of detecting and/or estimating a motion vector for the pixels of a video picture and correcting a predetermined number of pixels before and/or behind a current pixel in the direction of a motion vector.

3. Method according to claim 2, wherein the motion vector length determines which of the pixels before and/or behind the current pixel are to be corrected.

4. Method according to claim 1, wherein with respect to an edge of an object being displayed exponentially decreasing portions are added to the video data for the luminous elements near the edge in order to compensate the different time responses of the luminous elements.

5. Method according to claim 1, wherein the correction values Corr(x) for the pixels behind a current pixel are calculated based on the following formula:

$$\mathrm{Corr}(x)=([B_n-B_{n+1}]/255*a*B_n*\exp(-b*x*v)).$$

where x is the pixel position on the trail, v is the motion vector length, $B_n$ is the video value of the color component not belonging to the slowest kind at the position of the current pixel, $B_{n+1}$ is the video value of the color component not belonging to the slowest kind at the position of the neighboring pixel and a and b are adjustment constants.

6. Device for processing video pictures for display on a display device having at least two kinds of luminous elements with different time responses, wherein one kind is a slowest kind of luminous elements which slows the slowest time response, comprising a compensation unit for correcting at least one of the color components video data for driving the luminous elements not belonging to the slowest kind, which is positioned ahead of a sub-field coding unit with respect to the signal processing path, so that the differences in time responses of luminous elements are artificially compensated, wherein the compensation unit performs a compensation of a temporal trail of a moving object by adding gradated correction values to the video data not belonging to the slowest kind of the pixels of the trail.

7. Device according to claim 6, further including a motion estimator that provides motion vector data for the pixels of the video picture.

8. Device according to claim 6, wherein with respect to an edge of an object to be displayed the compensation means add exponentially decreasing portions of correction values to the pixels near the edge in direction of the estimated motion vector of a current pixels in order to compensate for the different time responses of the luminous elements.

9. Device according to claim 8, wherein the exponentially decreasing portions for a given motion vector are stored in a look-up table.

10. Device according to claim 9, wherein the exponentially decreasing portions read out of the look-up table are adjusted with a scaling factor $[B_n-B_{n+1}]/255$, where $B_n$ is the video value of the colour component not belonging to the slowest kind at the position of the current pixel, and $B_{n+}$is the video value of the colour component not belonging to the slowest kind at the position of a neighbouring pixel.

11. Display device including the device for processing video pictures according to claim 6.

* * * * *